United States Patent [19]

Imai et al.

[11] Patent Number: 5,571,766

[45] Date of Patent: Nov. 5, 1996

[54] THERMAL DYE TRANSFER PRINTING METHOD AND INTERMEDIATE MEDIA THEREFOR

[75] Inventors: Akihiro Imai, Ikoma; Hiroyuki Matsuo, Neyagawa; Yasuo Fukui, Kadoma; Nobuyoshi Taguchi, Ikoma, all of Japan

[73] Assignee: Matsushita Electric Industrial Co., Ltd., Japan

[21] Appl. No.: 462,789

[22] Filed: Jun. 5, 1995

Related U.S. Application Data

[62] Division of Ser. No. 997,199, Dec. 28, 1992, Pat. No. 5,444,037.

[30] Foreign Application Priority Data

Dec. 27, 1991 [JP] Japan .................................. 3-346127

[51] Int. Cl.$^6$ .............................. B41M 5/035; B41M 5/38
[52] U.S. Cl. .......................... 503/227; 156/235; 156/240; 428/195; 428/913; 428/914
[58] Field of Search .............................. 8/471; 428/195, 428/500, 913, 914; 503/227; 156/235, 240

[56] References Cited

U.S. PATENT DOCUMENTS

| | | | |
|---|---|---|---|
| 5,006,502 | 4/1991 | Fujimura et al. | 503/227 |
| 5,053,381 | 10/1991 | Chapman et al. | 503/227 |
| 5,055,444 | 10/1991 | Kaszczuk | 503/227 |
| 5,132,277 | 7/1992 | Kaszczuk et al. | 503/227 |
| 5,260,256 | 11/1993 | Takahara et al. | 503/227 |
| 5,281,976 | 1/1994 | Imai et al. | 346/76 PH |
| 5,342,818 | 8/1994 | Imai et al. | 503/227 |
| 5,438,348 | 8/1995 | Imai et al. | 346/135.1 |
| 5,444,037 | 8/1995 | Imai et al. | 503/227 |

FOREIGN PATENT DOCUMENTS

| | | | |
|---|---|---|---|
| 0455213 | 11/1991 | European Pat. Off. | 503/227 |
| 0496337 | 7/1992 | European Pat. Off. | 503/227 |
| 2-038056 | 2/1990 | Japan | 503/227 |

OTHER PUBLICATIONS

*Patent Abstracts of Japan*, vol. 12, No. 218 (M–711), Jun. 22, 1988; and JP–A–63017091 (Seiko Epson Corporation), Jan. 25, 1988.

*Patent Abstracts of Japan*, vol., 12, No. 218 (M–711), Jun. 22, 1988; and JP–A–63017087 (Seiko Epson Corporation), Jan. 25, 1988.

*Primary Examiner*—Bruce H. Hess
*Attorney, Agent, or Firm*—Wenderoth, Lind & Ponack

[57] ABSTRACT

The present invention enables to print the image of high picture quality on an ordinary paper or other arbitrary substrate for sublimation thermal transfer printing by the thermal transfer printing method, wherein using the combination of a transfer printing member with a coloring material layer on the substrate A, intermediate medium with dye-receiving layer on the substrate B and an image receiving member.

8 Claims, 3 Drawing Sheets

THERMAL DYE TRANSFER PRINTING METHOD AND INTERMEDIATE MEDIA THEREFOR

This is a divisional application of Ser. No. 07/997,199, filed Dec. 28, 1992, now U.S. Pat. No. 5,444,037.

BACKGROUND OF THE INVENTION

1. Field of the Invention

The present invention relates to a novel thermal dye transfer printing method and an intermediate media therefor which uses such printing means as thermal head, optical head such as laser, electrifying head etc. and the intermediate media used therefor. In particular, it is related to the printing method having advantageous characteristics in the printing on the ordinary paper by sublimation type thermal dye transfer printing and an intermediate media therefor.

2. Description of Prior Art

In the thermal dye transfer printing, an image transfer member having a coloring matter layer and an image receiving member are overlapped and the image is formed directly on the image receiving member by printing head. There is known such method that the image is once transferred on another medium by arbitrary method including thermal dye transfer printing and subsequently the image on the intermediate medium is transferred to the ultimate image receiving member, thus forming the image on the image receiving member (e.g. Japanese Kokai Publication No. 60-92897, No. 58-222877, U.S. Pat. 4,923,848).

Among various thermal dye transfer printing methods, the sublimation type thermal dye transfer printing provides the picture quality close to that of the photograph, but in order to obtain such preferred picture quality and printing density, a special sheet on which a dye-receiving layer is formed is required. When printing is made directly on the ordinary printing paper such as ordinary paper, such preferred picture quality and printing density can not be obtained, since the surface of ordinary printing paper is rough and lacks the dye-receiving layer. In the case when the method wherein image is formed first on another intermediate medium and then such image is transferred to the ultimate image receiving member (e.g. ordinary paper) to form an image on the image receiving member is applied to the sublimation type thermal dye transfer printing, many problems occur. That is, when image is formed on the ordinary paper using an intermediate medium, the dye-receiving layer on the intermediate medium is also transferred to the ordinary paper and therefore the luster of the surface of ordinary paper becomes stronger and its appearance and touch become similar to those of coating a dye-receiving layer on the ordinary paper and the quality of image as the one on the ordinary paper deteriorates (the luster is too high for the image on the ordinary paper).

SUMMARY OF THE INVENTION

The objective of the present invention is to provide the printing method and the intermediate media therefor which enable to print high quality image on an any substrate including ordinary paper by sublimation type thermal dye transfer printing and particularly enable to provide the printed image wherein the luster at the transfer-printed part is remarkably small and thus no incompatible feeling exists between the surfaces of the ordinary paper and the transfer-printed part.

The printing method according to the present invention employs a combination of a transfer printing member having a coloring matter layer on the substrate A, an intermediate medium having dye-receiving layer on the substrate B and an image receiving member, said dye-receiving layer being formed by polymer with flow softening point at less than 300° C., a polymer with average polymerization degree of less than 3000 or polyvinyl acetal, wherein the surface of the coloring material layer of transfer printing member is first overlapped with the surface of the dye-receiving layer of the intermediate medium and sublimation type thermal dye transfer image is transfer-printed in the dye-receiving layer of the intermediate medium by heating the transfer printing member with a printing head and subsequently the intermediate medium is overlapped with said image receiving member in the way that the surface of the dye-receiving layer with printed image comes to the side of said image receiving member and after the dye-receiving layer with printed image is transferred from the substrate B of the intermediate medium to said image receiving member by heat and/or pressure, the dye-receiving layer of the image receiving member is fixed on the image receiving member by heat and/or pressure.

DETAILED DESCRIPTION OF THE INVENTION

Figure 1:
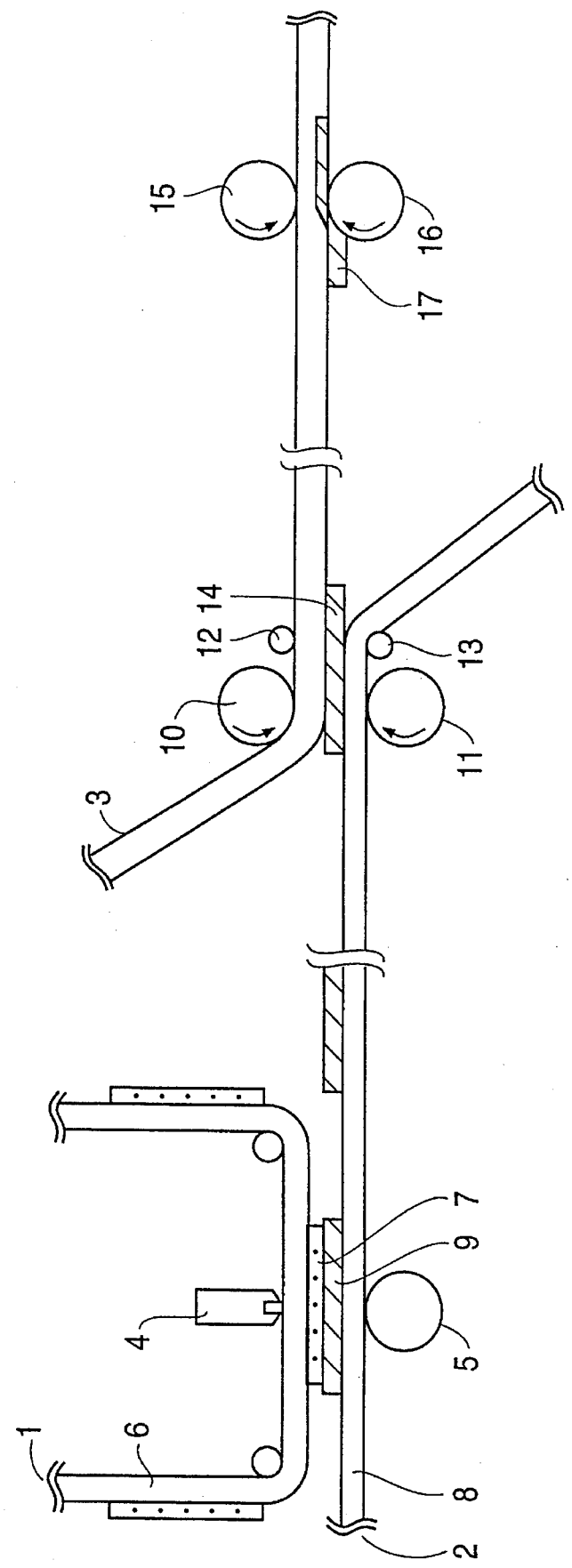
FIG. 1 is the schematic drawing which indicates the printing method as an example of the printing method of the present invention.

FIG. 1 is the schematic drawing which indicates in principle, the method of printing, as an example of the printing method of the present invention. Of course the present invention is not limited by FIG. 1 in regard to the respective transfer printing member, construction of the image receiving member and driving system, position and quantity etc. of the printing head, platen and the respective roll.

In FIG. 1, intermediate medium is shown by the representative example of the intermediate medium wherein the dye-receiving layer exists on the substrate B.

The image transfer member 1 and intermediate medium 2 are sandwiched between the printing head 4 and platen 5 under an appropriate compression pressure, in such way that the coloring material layer 7 of the transfer printing member 1 overlaps with the dye-receiving layer 9 of the intermediate medium 2 and thereby the image is printed to the dye-receiving layer 9 of the intermediate medium 2 by heating the transfer printing member with the printing head 4. In this case, the transfer printing member and intermediate medium may be driven for printing at the same speed or at a relative speed where they run with certain difference in speed.

When the system has one printing head and a second color is printed with the same head, the intermediate medium is first rewinded and then the second color may be printed in the dye-receiving layer in which the first color is printed (for instance, using the coloring material layer of the second color of the transfer printing member having the coloring materials layers of plural number of colors). Thereafter the 3rd color and on may be printed in the same manner. When plural number of printing heads are used, printing speed is improved as it is possible to print various colors by allocating such colors to the respective printing head by the conventionally known method.

There is no particular restriction to the printing head as long as it can form image in the dye-receiving layer of the intermediate medium by sublimating or diffusing the coloring material layer of transfer printing member, using, for example, thermal head, electrification head, optical head, etc.

Subsequently the intermediate medium 2 with printed image is coupled with the image receiving member 3 and heat and/or pressure is applied thereto in the state where dye-receiving layer of the intermediate medium faces the surface of the image receiving member and thus the dye-receiving layer 14 with the printed image of the intermediate medium 2 is transferred from the substrate B 8 of the intermediate medium to the image receiving member 3.

Subsequently heat and/or pressure is applied further to the dye-receiving layer which has been transferred to the image receiving member 3 (for example the image receiving member 3 with dye-receiving layer 17 on which the image is printed is passed between the heating roll 15 and heating silicone rubber roll 16) and thereby the dye-receiving layer 17 is fixed on the image receiving member 3 to form the image.

When the image receiving member 3 is an ordinary paper such as wood free paper, medium or low quality paper or bond paper, it is possible to inject (or fill) the dye sufficiently in between the fine fibers of the paper by using a polymer with flow softening point of less than 300° C., or a polymer with average polymerization degree of less than 3000, preferably polyvinylacetal.

As the result, the luster at the surface of the paper decreases and the apparent feeling of presence of the dye-receiving layer at the surface of the paper disappears. As the result the visual difference between the sheet surface where dye-receiving layer exists and the surface where it does not becomes almost none and the highly preferable printed image is obtained on the ordinary paper.

For instance, in the case of ordinary paper, the luster of the part with fixed image becomes almost same with the luster of the unprinted part of the surface. The dye-receiving layer in which an image is printed is normally in the form of thin film made on the intermediate medium and it is formed with the polymer of low softening point and/or low average polymerization degree and even when such dye-receiving layer is injected in between fibers, no such problem occurs as destruction of the image of the dye-receiving layer, thus enabling to form a high quality image on the ordinary paper.

Especially when polyvinylacetal is used for the dye-receiving layer, in the step to transfer the image by overlapping the coloring material layer of the image transfer member on the dye-receiving layer of the intermediate medium and applying thermal head etc., the dye-receiving layer does not peel off from the substrate and is not transferred to the coloring material layer even when the substrate of the intermediate medium is polyester film. But when the dye-receiving layer in which image is printed is transferred to the ordinary paper, the dye-receiving layer easily detaches from the substrate and it is apt to be transferred to the ordinary paper. When the dye-receiving layer is caused to infiltrate into fibrous material such as paper and fixed there, a printed image with remarkably low luster is obtained. It is considered to be because polyvinylacetal resin has, within its molecule, both a non-polar group such as hydrogen or an alkyl group higher than methyl group at the terminal and a hydroxy group which contributed to the adhesiveness and thus the resin has an appropriate adhesive strength and anti-peeling characteristic against the polyester film. Also, the luster of coated polymer film itself is low and, since average polymerization degree is low, a printed image of remarkably low luster is obtained.

It is obvious that printing head, platen, heating roll, heating silicone rubber roll or other rolls may be so constructed as to take positions variable according to the movement of image transfer member, intermediate medium or image receiving member. In FIG. 1, the driving systems etc. between platen 5 and roll 10 and between heating roll 10 and heating roll 15, etc. are omitted but obviously the rolls such as pinch roller etc., intermediate medium travel adjusting device, the device for adjusting the travel of image receiving member etc. may be present.

Application of heat and/or pressure on the image receiving member and the intermediate medium or at least on the image receiving member with dye-receiving layer may be executed, for instance, by passing the image receiving member and intermediate medium or at least image receiving member with dye-receiving layer between the media at least either one of which is heated and under an appropriate compression pressure or between the media under high compression pressure or under a light source having a large radial heat. For such media may be used a roll, flat-plate-shaped member, heat-resistant film, elastic member (film or sheet) or thermal printing head etc. It is preferred that in particular the surface of the medium used for fixing has an easily releasing property. Various heating methods such as halogen lamp, nichrome wire, electroconductive film etc. may be employed. In FIG. 1, as an example of such medium, (metal) heating roll and silicone rubber heating roll are used. For heating roll, rubber (rubber clad) roll such as silicone rubber, fluoride rubber, or polyurethane rubber roll, plastic roll, metal roll, Teflon-coated roll etc. may be used. For the rubber of the rubber (rubber-clad) roll or the elastic member of the medium, various synthetic rubber such as chloroprene rubber, isoprene rubber, butyl rubber, butadiene rubber, nitrile butadiene rubber, tetrafluoroethylene-propylene rubber, acrylic rubber, epichlorohydrin rubber, styrene-butadiene rubber, hydrogenated-nitrile rubber, polysulfide rubber or natural rubber may be used.

For elastic member those of various hardness may be used. The method to apply heat and/or pressure is not particularly restricted as long as it has the effect to transfer the dye-receiving layer of intermediate medium to the image receiving member or the effect to fix the dye-receiving layer on the image receiving member, but the preferred method is to use two rolls under appropriate compression pressure (for instance, the spring, electromagnetic or pneumatic pressure etc.) at least one of which is a heated roll. For instance, it may be a combination of an elastic roll such as silicone rubber roll and a metal roll or a combination of an elastic roll and an elastic roll or alternatively at least one of the two is a roll or heating roll and the other is a heating or heated medium such as hot plate, a light source with large radial heat, heated film etc.

Especially in the case of fixing, a printed image of remarkably low luster is obtained by using the elastic member such as elastic roll at the dye-receiving layer side of the image receiving member. The elastic member of the elastic roll may contain various granules such as carbon, white carbon, etc. or coloring agent such as pigment. As the elastic member, various thermoplastic elastomers such as urethane, polyester, olefin, styrene, polyamide, fluorinated polymer compound may be used. By using a thermal printing head such as thermal head or electrification head as a member of the media, it is possible to transfer and/or fix only the necessary part of the transferred layer (for instance, only the region which contains printed image of the dye-receiving layer) on the image receiving member. Heating temperature is not particularly limited, but usually it is in the range of normal temperature to 300° C. Pressure is neither specifically limited but usually it is less than $10^9$ Pa.

Transfer of dye-receiving layer 14 may be executed in either of the manners that for instance, immediately following the heating roll 10 and heating silicone rubber roll 11, the dye-receiving layer 14 is peeled off the substrate B8 of the intermediate medium and transferred to the image receiving member 3 or that subsequent to cooling by elapse of time after passing between the heating rolls as illustrated in FIG. 11 (for instance subsequent to passing between rolls 12 and 13), dye-receiving layer 14 is peeled off the substrate B8 of the intermediate medium and transferred on to the image receiving member 3.

When color image is formed in the dye-receiving layer using an image transfer member having plural number of coloring material layer, for instance, cyan coloring material layer, Magenta coloring material layer, yellow coloring material layer etc., the color image may be formed by plural number of coloring material layer in the dye-receiving layer or image of various colors may be formed in the respective dye-receiving layer by the respective coloring material layer (for instance dye-receiving layer is provided separately on the substrate B8 ).

In particular, in the latter case, it is possible to form the image in plural number of colors or in full color on the image receiving member by overlappingly transferring the dye-receiving layers of various colors, in the step of transfer of the image on the image receiving member 3. Or when the intermediate medium has various other layers in addition to dye-receiving layer on the substrate B (for instance, polymer material layer, UV-ray absorption agent layer or overcoat layer etc. at the respectively different position of the substrate), it is possible to overlappingly transfer various layers, for instance, overlap dye-receiving layer with no image on the dye-receiving layer with image or overlap UV ray absorbing agent layer on a dye-receiving layer with image or overlap polymer material layer on the dye-receiving layer with mono-color image or further overlap such two layer units repeatedly. When the image transfer member has a pigment ink layer as one of the other layers, it is possible to print pigment ink layer on the substrate or the dye-receiving layer of the image transfer member by printing head and subsequently transfer it to the image receiving member or overlappingly transfer to the dye-receiving layer which has been formed on the image receiving layer, thus forming the sublimation type image and molten type image on the image receiving member. By fixing the image transfer layer on the image receiving body as aforesaid, an image of preferred quality may be formed on the image receiving member.

In the above, the intermediate medium with such construction that a dye-receiving layer is provided on the substrate B has been described but the process is fundamentally same with the aforesaid printing method also for the intermediate medium having successively laminated layers of polymer substance layer and dye-receiving layer on the substrate B or intermediate medium with the successively laminated layers of releasing layer and dye-receiving layer on the substrate B, or the intermediate medium with the successively laminated layers of releasing layer, polymer material layer and dye-receiving layer on the substrate B.

However, in the case of the intermediate medium having successively laminated layers of polymer material layer and dye-receiving layer on the substrate B, fixing is conducted after such successively laminated layers are peeled off from the substrate B surface of the intermediate medium and the polymer material layer and dye-receiving layer are transferred to the image receiving member, while in the case of the intermediate medium having successively laminated layers of releasing layer and dye-receiving layer on the substrate B, fixing is performed after the dye-receiving layer is peeled off from the interface of the releasing layer and the dye-receiving layer of the intermediate medium and then the dye-receiving layer is transferred to the image receiving member and in the case of the intermediate medium with the successively laminated layers of releasing layer, polymer material layer and dye-receiving layer on the substrate B, fixing is performed after the successively laminated layers of polymer material layer and dye-receiving layer are peeled off from the interface of releasing layer and polymer material layer of the intermediate medium and the polymer material layer and dye-receiving layer are transferred to the image receiving member.

Although it is omitted in FIG. 1, the image transfer member may be constructed in the form of cassette wherein image transfer member is winded around the feeding out roll and winding up roll. Intermediate medium may also be constructed in the same way as a cassette. Furthermore, the image transfer member having plural number of coloring material layer such as cyan coloring material layer, Magenta coloring material layer, yellow coloring material layer (or in addition, for instance, black coloring material layer) on the substrate A6 or intermediate medium having plural number of dye-receiving layers (or in addition various other layers) may naturally be used as aforesaid.

Figure 2:
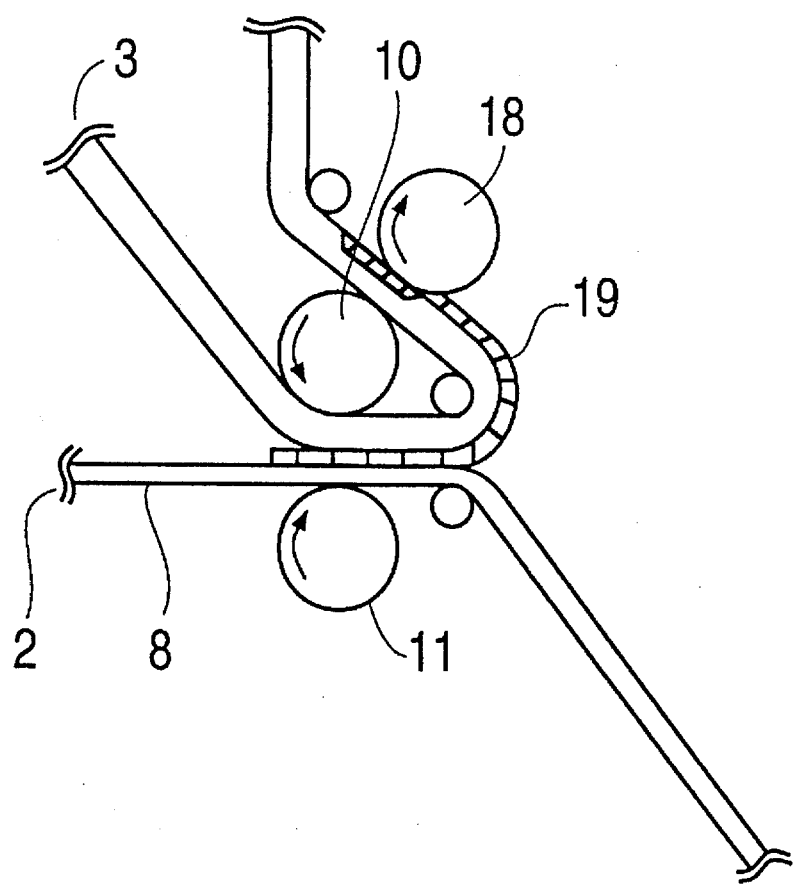
FIG. 2 is the partial schematic drawing to show, in principle, the part where the dye-receiving layer of the intermediate medium is transferred to the image receiving member and subsequently said dye-receiving layer is fixed on the image receiving member, as an example of the printing method of the present invention.

FIG. 2 is the partial schematic drawing which indicates in principle the part where dye-receiving layer is transferred to and fixed on the image receiving member, as an example of printing method of the present invention.

In FIG. 2, if the roll in image transfer section and the roll for fixing section are separately provided, number of rolls become too many and so the heating roll 10 of the image transfer section is used also as the roll of fixing section to reduce the number of rolls.

In FIG. 2, heating roll 10 and heating silicone rubber roll 11 are the rolls of the image transfer section while the heating roll 10 and heating silicone rubber roll 18 are the rolls of fixing section. In FIG. 2, a combination of heating roll and heating silicone rubber roll is used for the rolls of image transfer section and fixing section but as aforesaid, the rolls of the image transfer section and the fixing section are not limited to these combinations.

Figure 3:
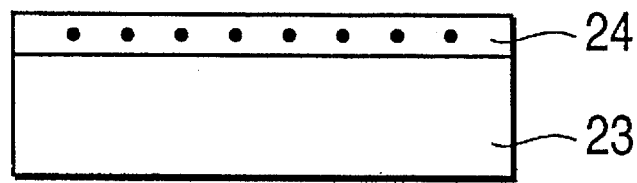
FIG. 3 is the schematic drawing of the cross section of the transfer printing member, which represents an example of the present invention.
Figure 4:
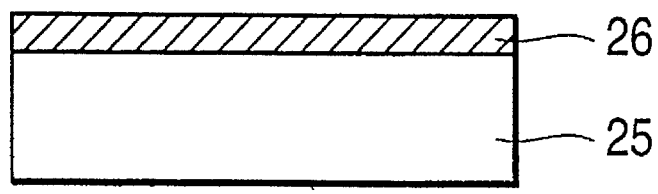
FIGS. 4 to 7 are the schematic drawings of the cross sections of the intermediate media representing the examples of the present invention.

FIG. 3 is the schematic drawing of the section of the image transfer member used for printing in the present invention which is shown as an example of practice. The image transfer member is composed of at least substrate A 23 and coloring material layer 24. Substrate A 23 is not specifically restricted. For instance it may be various polymer films, polymer film with the surface treated by coating etc. or it may be various electroconductive films. The polymer film may be polyolefin, polyamide, polyester, polyimide, polyether, cellulose, polyparabanic acid, polyoxadiazole, polystyrene or fluorinated film. Particularly polyethylene terephthalate, polyethylene naphthalate, aramide, triacetylcellulose, polyparabanic acid, polysulfone, polypropylene, cellophane, moisture-proof cellophane or polyethylene film is useful. It is particularly preferred when the substrate A has heat-resistant layer, slippery layer (or slippery electroconductive layer), slippery heat-resistant layer (or slippery heat-resistant electroconductive layer) at least on one side, as it improves heat resistance of substrate A or driving stability of printing head is good. Also for the substrate A, it is preferred to use a polymer film or electroconductive film having an adhesive layer (anchor-coating layer) at the surface where a polymer film or electroconductive film contacts coloring material layer so that the coloring material layer should not peel off from the film at the time of printing. For the electroconductive film, polymer film containing various electroconductive granules such as carbon black, metal powder etc. polymer film on which electroconductive layer is coated, polymer film with electroconductive deposition layer etc. may be used.

Coloring material layer is composed of at least coloring material and a binder. For coloring material, there is no particular restriction. For instance, disperse dyes, basic dyes, color former etc. may be used. For the binder, various polymer materials may be used. For instance, acrylic resin, styrene type resin, urethane type resin, polyester type resin, polyvinylacetal type resin, vinyl acetate type resin, chlorinated resin, amide type resin, cellulose resin may be used. For cellulose resin, for instance, methyl cellulose, ethyl cellulose, hydroxyethyl cellulose, carboxymethyl cellulose, nitrocellulose, cellulose acetate etc. may be used. Particularly when at least one polymer selected out of the following polymers is used for the binder, printing sensitivity is better and/or excellent thermal fusion preventive characteristic against dye-receiving layer is obtained, such polymers being acrylonitrile-styrene copolymer resin, polystyrene, styrene-acrylic copolymer resin, saturated polyester, polyester-urethane, polyvinyl chloride resin, chlorinated polyvinyl chloride resin, vinyl chloride-vinyl acetate copolymer resin (which may be copolymerized further with vinyl alcohol, maleic acid and other components), vinyl chloride-acrylate ester copolymer resin (including multi-component copolymer resin containing plural kinds of acrylate ester), vinyl acetate resin, chloride rubber, chlorinated polypropylene, polycarbonate or cellulose resin. Copolymer resin may be a copolymer resin composed of more than 3 components. Particularly when polyvinyl acetal such as polyvinyl formal, acetoacetalated polyvinyl alcohol, propionacetalated polyvinyl alcohol, polyvinyl butyral is used for both binder of the coloring material layer and dye-receiving layer of intermediate medium, printing sensitivity is high and thus it is particularly preferred. It is particularly preferred when the glass transition point of the polymer material is in the range of 40° C.–150° C. or average polymerization degree of polymer material is in the range of 150–3000 or flow softening point is in the range of 80° C.–350° C.

When coloring material layer is composed of at least one kind of resin selected out of fluorine-containing moisture-curable resin or siloxane-containing moisture hardening resin, coloring material and binder, since the characteristics of fluorine-containing moisture hardening resin or siloxane containing moisture hardening resin is superior as the releasing agent, printing can be made without causing thermal fusion phenomenon at the time of thermal image transfer printing using a combination of transfer printing member and intermediate medium.

Fluorine-containing moisture hardening resin or siloxane-containing moisture hardening resin may be, for instance, a moisture hardening resin with hydrolyzing silyl group or hydrolyzing isocyanate group as described in the Japanese Patent Application Ser. No. Sho 63-144241, in which fluorine or silicone is introduced respectively.

Fluorine containing moisture hardening resin may be, for instance, fluorine-containing polymer etc. having hydrolyzing silyl group, for instance, the moisture hardening resin etc. described on the Japanese Kokai Publication Sho 62-558, especially a fluorine-containing acrylic silicon resin is preferred while and a fluorine-containing polyurethane resin having hydrolyzing isocyanate group at the terminal of the molecule or at the side chain is also useful. Siloxane-containing moisture hardening resin may be, for instance, siloxane-containing vinyl polymer with hydrolyzing silyl group etc. and particularly siloxane-containing acrylic silicon resin is useful and siloxane-containing polyurethane resin with hydrolyzing isocyanate group at the terminal of the molecule or at the side chain is also useful. Fluorine-containing acrylic silicon resin and siloxane-containing acrylic silicon resin etc. modified by urethane resin etc. is also useful. Fluorine-containing acrylic silicon resin may be, for instance, fluorine-containing acrylic silicon resin solution (F-2A, Sanyo Chemical Industries Ltd.) and siloxane-containing acrylic silicon resin may be, for instance, siloxane-containing acrylic silicon resin solution (F-6A, Sanyo Chemical Industries Ltd.) and siloxane-containing moisture hardening resin with hydrolyzing isocyanate group may be, for instance, siloxane-containing moisture hardening resin solution (SAT-300P, Shinko Technical Research Co., Ltd.). For coloring material layer, reaction accelerator for moisture hardening resin may be used upon necessity. For reaction accelerator, titanates., amines, organic tin compounds, acid compounds, for instance, metal salt of carboxylic acid such as alkyl titanate salt, tin octylate, dibutyltin dilaurate, dibutyltin maleate, etc., amine salt of dibutylamine-2-hexoate etc. and the catalyst described in Japanese Kokai Publication. No 58-19361 may be used. Amount of addition of reaction accelerator is usually 0.001–100 wt % as against the amount of resin.

When moisture hardening resin is used in the form of paint etc. preservative and stabilizer is added upon necessity and such stabilizer may be the one described in Japanese Kokai Publications Sho 60-51724 and Sho 57-147511 etc.

Coloring material layer may be of multi-layer construction. Or slippery layer or various coated layer may be provided on the coloring material layer. In order to prevent thermal fusion with the dye-receiving layer at the time of printing, various additives such as fluorine-containing moisture-curable resin or various silicone-type or fluoride type materials, or antistatic agent may be added.

Figure 5:
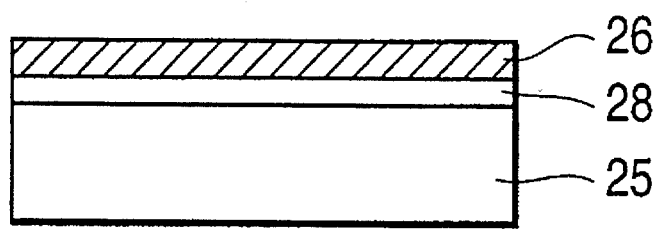
Figure 6:
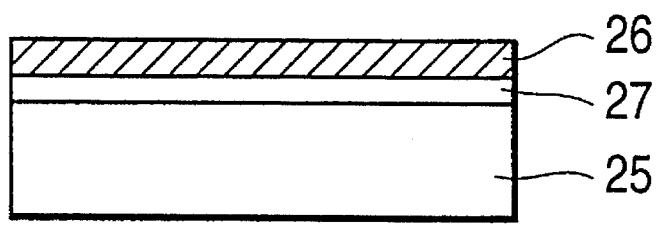
Figure 7:
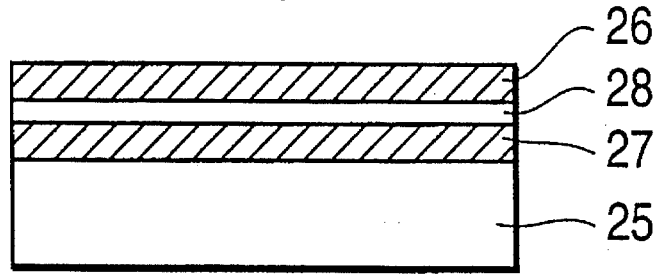

FIGS. 4–7 are the schematic drawings to show the sectional view of an example of the intermediate medium to be used for printing according to the present invention. Intermediate medium is composed of at least substrate B25 and dye-receiving layer 26. Or as shown in FIG. 5 it is composed of at least substrate B25, polymer material layer 28 and dye-receiving layer 26. Or as shown in FIG. 6 it may be composed of substrate B25 releasing agent layer 27 and dye-receiving layer 26. Or as shown in FIG. 7, it may be composed of at least substrate B25, releasing agent layer 27, polymer layer 28 and dye-receiving layer 26. For the dye-receiving layer in the aforesaid various compositions of the intermediate medium, polymer with flow softening point of less than 300° C. and average polymerization degree of less than 3000 or polyvinylacetal is at least used or at least used for forming.

Flow softening point (temperature at the start of flow-out) is a measured value by flow tester (temperature rising speed: 6° C./min., extrusion pressure: $9.80665 \times 10^6$ Pa, die: 1 mm (diameter)×10 mm).

Intermediate medium may have the compositions other than the above as long as it has at least the substrate B and the aforesaid dye-receiving layer and any of such composition are included in the present invention. For the intermediate medium, the intermediate medium described in Japanese Patent Application Ser. No. Hei 3-164341 may be used. Dye-receiving layer, polymer material layer or two layers comprising polymer material layer and dye-receiving layer may be formed on the substrate B (or on the releasing agent layer on the substrate B) either by coating or by transfer from other medium. Hereunder are described the materials of composition etc. of each layer but the present invention is not limited to the combinations of layers described hereinbelow.

Substrate B25 is not specifically restricted. Paper etc. the surface of which is given smoothing treatment may be used but particularly useful are, for instance, various polymer films, polymer films with the surface treated by coating etc. or various electroconductive films.

For various polymer films, films described in the paragraph of transfer printing member are useful. The thickness of polymer film may be usually about 2–100 μm preferably 2–30 μm. Various polymer films may have heat resistant layer to reinforce heat resistance against thermal deformation etc. of polymer film, antistatic layer or if necessary various coated layers. Various electroconductive film used for substrate B25 may be various electroconductive films described in the paragraph describing substrate A of said transfer printing member.

Dye-receiving layer 26 may, upon necessity (for instance, in the case when leuco-dyes etc. are used for the coloring material layer of transfer printing member) contain. color developing agent such as electron receiving material. Electron receiving material may be, for example, phenolic compound such as bisphenol A, carboxylate compound, silica, activated clay, etc.

Polyvinylacetal is particularly useful as the polymer of dye-receiving layer 26. Polyvinylacetal is the resin obtained by reacting polyvinyl alcohol with various aldehydes, for instance, formaldehyde, acetoaldehyde propionaldehyde or butylaldehyde etc. For instance, polyvinylformal, acetoacetalated polyvinyl alcohol, propionic acetalized polyvinyl alcohol or polyvinyl-butyral etc. are particularly useful. Polyvinylacetal type resin described in Japanese Kokai Publications Hei 3-65391 and Hei 3-162989 is also useful. From the viewpoint of printing sensitivity, transfer printing and fixing characteristic to the image receiving member, polyvinylacetal obtained from polyvinyl alcohol with average polymerization degree of less than 3000 indicates the preferred characteristics as the polyvinylacetal, used for the polymer. Or polyvinylacetal with flow softening point of less than 300° C. indicates a preferred characteristics.

Especially when image receiving member is an ordinary paper such as wood free paper, polyvinylacetal obtained from the polyvinyl alcohol with smaller molecular weight having average polymerization degree of less than 2000 or polyvinylacetal with flow softening point of less than 250° C. are particularly preferred as their infiltration into the narrow space between fibers of the paper is superior.

The larger the acetalation degree, the larger is the effect for prevention of thermal fusion of coloring material layer and the lower becomes the flow softening point and fixing on the image receiving member is better. It is particularly preferred when acetalization degree is more than 50 mol %. Especially when butylarization degree of polyvinylacetal is more than 40 mol % preferably more than 50 mol %, effect for prevention of thermal fusion with coloring material layer, printing sensitivity, transfer property and fixing characteristics are particularly superior. For polyvinyl butyral, for instance, the brand offered by Sekisui Chemical Co., Ltd., namely, BL-1 (butyralization degree=63±3 mol %, flow softening point, 105° C.), BI-2 (butyralization degree= 63±3 mol %, flow softening point 120° C.), BH-S (butyralization degree=over 70 mol %, flow softening point, 160° C.), BM-S (butyralization degree=over 70 mol %, flow softening point, 150° C.), BL-S (butyralization degree=over 70 mol %, flow softening point, 110° C.), BH-3 (butyralization degree=65±3 mol %, flow softening point, 205° C.), BM-2 (butyralization degree=68±3 mol %, flow softening point, 140° C.) BM-1 (butyralization degree=65±3 mol %, flow softening point, 130° C.), BM-5 (butyralization degree=65±3 mol %), flow softening point, 160° C.) are particularly preferred. The polyvinyl butyrals mentioned above generally are prepared from polyvinyl alcohols having an average polymerization degree of about 300 to 1,700. The term "average polymerization degree" herein indicates an average polymerization degree of polyvinyl alcohol before forming polyvinyl acetal. It is also acceptable that polyvinyl-acetal reacts with phenolic resin, epoxy resin, melamine resin, isocyanate compound or dialdehyde compound etc. and forms bridged construction.

The polymer of the dye-receiving layer 26 may be, for instance, acrylic resin, urethane resin, polyester resin, vinyl acetate resin, chlorinated resin, styrene resin, amide resin or cellulose resin, etc. The case where it is formed by at least one kind of the resins selected from acrylonitrile-styrene copolymer, polystyrene, styrene-acrylic copolymer resin, rubber chloride, chlorinated polypropylene, polyvinyl chloride, chlorinated vinyl chloride resin, vinyl chloride-vinyl acetate copolymer resin, vinyl chloride-acrylate copolymer resin, vinyl acetate resin, saturated polyester, polyester urethane, polycarbonate or cellulose type resin is also particularly preferred. When layer 26 is formed by at least one kind of the resin selected out of fluorine-containing moisture hardening resin or siloxane-containing moisture hardening resin, its resistance to thermal fusion with coloring material layer is particularly superior. Since fluorine-containing moisture hardening resin and siloxane-containing moisture hardening resin have already been described in the paragraph of transfer printing member, their descriptions are omitted here. Since fluorine-containing moisture hardening resin and siloxane-containing moisture hardening resin have superior thermal fusion preventive characteristics, when such resin is built in the dye-receiving layer, thermal fusion with coloring material layer does not occur at all at the time of thermal transfer printing.

Particularly the dye-receiving layer composed of the combination of polyvinylacetal with superior thermal fusion preventing characteristics, fluorine-containing moisture hardening resin with superior thermal fusion preventing characteristic and/or siloxane-containing moisture hardening resin indicates a superior thermal fusion preventing characteristics against coloring material layer.

Polymer material layer 28 is formed at least by polymer material. Such polymer material is not specifically restricted. Such polymer substance may be, for instance, various thermoplastic resin, various hardening resins hardened by heat, light, electron beam etc. For instance, acrylic, urethane, amide, ester, cellulose, styrene or olefine type resin may be used. It is preferred to use at least one kind of polymer material selected out of acrylonitrile-styrene copolymer resin, polystyrene, styrene-acrylic copolymer resin, rubber chloride, chlorinated polypropylene, polyvinyl chloride resin, chlorinated polyvinyl chloride resin, vinyl acetate resin, vinyl chloride-vinyl acetate copolymer resin, vinyl chloride-acrylate copolymer resin, saturated polyester, polyester urethane, polyvinylacetal, polyvinyl alcohol, cellulose derivative, processed starch, starch derivative or polycarbonate for such polymer material. Particularly when polymer material layer is formed by at least one kind of polymer selected out of polyvinyl alcohol, polyvinyl alcohol derivative, cellulose derivative, processed starch, starch derivative, chlorinated resin or polycarbonate, the polymer layer gains a superior solvent resistance in the step of coating of dye-receiving layer forming paint which contains an aromatic solvent such as toluene or ketone solvent such as 2-butanone and besides its adhesiveness to the polyester film which is the typical base material is not very strong and therefore it easily peels off the polyester film. Polyvinyl alcohol derivative may be, for instance, various polyvinyl acetals, etc. Cellulose derivatives may be, for instance, methyl cellulose, ethyl cellulose, hydroxyethyl cellulose, carboxymethyl cellulose, nitrocellulose or cellulose acetate, etc. Processed starch may be, for instance, starch oxide or enzyme-processed starch, etc. Starch derivative may be, for instance, hydroxyethyl starch, carboxymethyl starch or cyanoethylated starch, etc. Chlorinated resin may be, for instance, chlorinated polyethylene, chlorinated polypropylene or rubber chloride, etc. Since these resins do not indicate stickiness at room temperature, it has superior anti-bleeding property against the dye of the printed image of the dye-receiving layer even when it is in contact with the dye-receiving layer and therefore its handling is easy. From the viewpoint of preservation stability of printed image, the glass transition point of the polymer material is preferred to be over 50° C.

When, for instance, paper is used for the image receiving member, the polymer substance with average polymerization degree of 150–3000 or flow softening point of 80°–300° C. is preferred as its infiltration into the gap between fibers of paper is superior. Especially the polymer substance with average polymerization degree of less than 2000 or flow softening point of less than 250° C. is preferred. When the polymer material layer 28 is formed by at least one kind of resin selected out of fluorine-containing moisture hardening resin or siloxane-containing moisture hardening resin and a polymer material, releasing property of polymer material layer from the substrate may be easily controlled and thus it is preferable.

Releasing layer 27 is not specifically restricted. For instance, when the releasing layer is formed at least by one kind of resin selected out of fluorine-containing moisture hardening resin or siloxane-containing moisture hardening resin, it indicates a particularly superior releasing property. Or the releasing layer may be formed by at least one kind of resin selected out of fluorine-containing moisture hardening resin or siloxane-containing moisture hardening resin and polymer material. Or various hardening resins hardened by heat, light, electron beam etc. which indicate preferred adhesiveness to the base material of the intermediate medium may be used for such purpose. Or releasing layer may be formed by various releasing agents such as shown below or various releasing agents and polymer material. For instance, various silicone oils with high stability represented by silicone type releasing material may be dimethylsilicone oil, phenylsilicone oil, fluorosilicone oil, various reactive or various modified Silicone oils such as SIH-modified, silanol-modified, alkoxy-modified, epoxy-modified, amino-modified, carboxyl-modified, alcohol-modified, mercapto-modified, vinyl-modified, polyester modified, fluorine-modified, higher fatty acid-modified, carnava-modified, amide-modified, alkylallyl-modified silicone oil, various silicone rubbers such as thermo-vulcanized, room temperature-curing or liquid type silicone rubbers, various silicone resins such as condensation-reaction type, addition reaction-type, peroxide hardening reaction type silicone resins, various silicone emulsion, various silicone resin powder, silicone rubber powder, etc.

Fluorine type releasing agent may be various fluoro-resins such as polytetrafluoro-ethylene, tetrafluoroethylene-perfluoroalkyl vinylether copolymer, etc., various fluoro-rubbers such as vinylidenefluoride-hexafluoropropylene type rubber, various fluoride type surfactant, fluoro-carbon, various fluoride rubber latex, fluorine-containing resin, etc. Also various fatty acid esters, various waxes, various oils, etc. are useful as releasing agent. Various hardening resins may be polyolacrylate, polyesteracrylate, epoxyacrylate, urethane acrylate, silicone acrylate, spiroacetal resin, phosphazene resin, epoxy resin, melamine resin, acrylic resin, phenolic resin, urethane resin, phenoxy resin, etc. UV ray and/or electron beam hardening resin such as oligoacrylate, epoxy resin etc. are useful. When polymer substance is used for the releasing layer 27, various resins stated in polymer substance layer 28 may also be used. Upon necessity, it may be used together with various releasing agents described above. An adhesive layer may be provided in between the substrate and the releasing layer.

Since dye-receiving layer 26 (or polymer substance layer 28 and dye-receiving layer 26) is sufficiently injected in between the fibers of the paper, the surface of the paper indicates preferred writing characteristics. To control the level of writing characteristics, various granules or transparent granules of synthetic amorphous silica, titanium oxide, calcium carbonate, alumina, etc. may be added to dye-receiving layer or polymer substance layer. Dye-receiving layer or polymer substance layer may contain, UV ray absorbing agent, oxidation preventing agent, or fluorescent material to improve light stability of the image.

Since polymer substance layer 28 is fixed to the image receiving member, it is preferred that the polymer substance layer is transparent. For such purpose, polymer substance layer of high transparency is preferred. Polymer substance layer may be a polymer substance layer which dyes or develops color of the dye of coloring material layer of the transfer printing member. Coloring material layer, dye-receiving layer or polymer material layer may contain various releasing agents independently or in combination. Various releasing agent may be releasing agents made of silicone type material or fluoride type material. Particularly various reactive or various modified silicone oil may be used therefore independently or in combination. Various antistatic agent may be added to dye-receiving layer, polymer material layer or releasing layer. For image receiving member, uncoated paper, coated paper, film, sheet, synthetic paper, continuous image receiving member or cut image receiving member etc. may be used without restriction to the material of construction, paper quality, style, etc. Since the image printed on the dye-receiving layer of the intermediate medium is transferred to and fixed on the image receiving member to form the image on the image receiving member, the image on the dye-receiving layer is right-left-reversed image (mirror image) as against the image on the image receiving member. Consequently, printing on the layer of the intermediate medium by printing head is executed usually taking into account the right-left reversing of the image on the image receiving member. The printing method of the present invention includes the method wherein the dye-receiving layer with printed image on the intermediate medium is once transferred to another intermediate medium and then transfer-printed and fixed on the ultimate image receiving member.

As aforesaid, by using the thermal image transfer printing method or the intermediate medium, a high quality printed image is obtained on any printing paper of any style such as ordinary paper, transparent film for OHP, bond paper with coarse surface, coated paper, coated film etc. and especially on such image receiving member as ordinary paper, a printed image of remarkably small luster is obtained. Hereunder are described the concrete examples of practice.

EXAMPLES

The present invention is illustrated by the following Examples which, however, are not to be construed as limiting the present invention to their details.

Example 1

Preparation of image transfer member

The following paint was coated by a wire bar on the anchor coat layer of polyethylene terephthalate (to be abbreviated as PET) film (thickness, 4 μm) having an anchor coat layer on the upper surface and it was dried to form a coloring material layer of about 1 μm in thickness.

(Paint)
Azo type disperse dyes 3.5 wt parts
Acrylonitrile-styrene copolymer resin 4 wt parts
Amide-modified silicone oil 0.04 wt parts
Toluene 25 wt parts
2-butanone 25 wt parts Preparation of intermediate medium A paint comprising polyvinyl butyral resin [BL-S(average polymerization degree: about 350), Sekisui Chemical Industries Ltd.]4 wt parts, siloxane-containing acrylic silicon resin solution (F-6A, effective component 54 wt %, Sanyo Chemical Industries. Ltd.) 0.37 wt parts, di-n-butyl tin dilaurate 0.002 wt part, toluene 18 wt parts and 2-butanone 18 wt parts was coated on a PET film with thickness of 9 μm by wire bar, it was dried and a dye-receiving layer of about 2 μm in thickness was formed and thus an intermediate medium was obtained.

Subsequently, an image transfer member composed of coloring material layer overlapped with a dye-receiving layer in a way as the surfaces face each other and an intermediate medium are sandwiched between the thermal head and the platter which are loaded with compression pressure of about 3kg and printing was made under the following printing conditions.
Printing speed: 33.3 ms/line
Printing pulse width: 2–8 ms
Max. printing energy: 6 J/cm$^2$ When transfer printing member was detached from the intermediate medium after printing, shade pattern was found to be clearly printed without causing fusion of coloring material layer of the transfer printing member with the dye-receiving layer of the intermediate medium.

Subsequently, an ordinary paper (wood free paper) was overlapped on the dye-receiving layer of the intermediate medium in which the image was printed and they were passed through the metal roll clad with silicone rubber with the surface temperature kept at around 180° C. (roll dia. 50 mm, rubber thickness 5 mm, rubber hardness 50°, heated by halogen lamp held inside the roll) and a metal roll with surface temperature at around 180° C. (dia. 50 mm, heated by halogen lamp held inside the roll) while holding the pressure between rolls at around 80 kg and feeding speed at 20 mm/sec. Then it was possible to peel off the PET film which was substrate of the intermediate medium from the ordinary paper and the dye-receiving layer in which the image was printed was found properly to be transferred to the ordinary paper. Then the ordinary paper with transferred dye-receiving layer was passed through the said rolls at the roll temperature of 160° C., pressure between rolls at around 150 kg keeping feeding speed at 20 mm/sec. in such way that the dye-receiving layer surface comes to the rubber roll side and thus the image was fixed.

The fixed image on the ordinary paper obtained as above has the reflective printing density of 1.5 at pulse width of 8 ms and the image had high picture quality having uniform dots for all the range from low printing density to high printing density. The surface luster of the ordinary paper with such fixed image was roughly same with that of the unprinted ordinary paper and pencil-writing characteristic was also superior.

Example 2

Preparation of transfer printing member

The following paint was coated by a wire bar on the anchor coat layer of the PET film (thickness 4 μm) having slippery heat resistant layer at the lower surface and an anchor layer at the upper surface and after painting it was dried to form a coloring material layer of about 1 μm in thickness.

(Paint)
Azo type disperse dye 3.5 wt parts
Polyvinyl butyral resin (BH-S, Sekisui Chemical Co., Ltd.) 4 wt parts
Amide-modified silicone oil 0.04 wt part
Toluene 25 wt parts
2-butanone 25 wt parts Preparation of intermediate medium A paint composed of 4 wt pads of polyvinyl butyral resin (BL-S), 0.83 wt part of fluorine containing acrylic silicon resin solution (F-2A, effective components 48 wt %, Sanyo Chemical Industries. Ltd.), 0.004 wt part of di-n-butyl tin dilaurate, 18 wt parts of toluene and 18 wt parts of 2-butanone was coated by a wire bar on the PET film of 9 μm in thickness and after drying, it was heat-treated at 100° C. for 30 min. to form a dye-receiving layer of about 2 μm in thickness, thus preparing an intermediate medium.

Using transfer printing member and the intermediate medium, image was printed in the dye-receiving layer of the intermediate medium in the same manner as in Example 1. When transfer medium was detached from the intermediate medium after printing, gradation pattern was found to be clearly printed without fusing of coloring material layer of the transfer printing member and the dye-receiving layer of the intermediate medium.

Subsequently, using a bond paper (cotton 100%) as the image receiving member, the image receiving member and intermediate medium in which image had been printed were passed through heating rolls (rubber hardness and pressure between rolls had been changed to 30° and about 50 kg respectively) in the same manner as in Example 1, and the PET film, which was the substrate of the intermediate medium, was detached from the bond paper and it was found that the dye-receiving layer in which the image had been printed was transferred on the bond paper. Subsequently the bond paper having thus transferred dye-receiving layer was passed through the heating rolls (rubber hardness and temperature had been changed to 30° and about 140° C. respectively) to fix the dye-receiving layer on the ordinary paper.

The image fixed on the bond paper as above had reflective printing density of 1.5 at pulse width of 8 ms. The image fixed on the bond paper having surface smoothness inferior to that of wood free paper also had high picture quality with uniform dots from low printing density to high printing density. The surface luster of the bond paper with such fixed image was roughly same with the surface luster of the unprinted bond paper and its pencil-writing characteristic was superior.

Example 3

A paint composed of 5 wt parts of polyvinyl butyral resin [BX-1(polymerization degree about 1700, flow softening point about 225° C.) Sekisui Chemical Co., Ltd.], 50 wt parts of toluene and 50 wt parts of 2-butanone was coated on a PET film of 6 μm in thickness and it was dried to form a polymer material layer of about 1.5 μm in thickness. Thereafter, a paint composed of 4 wt parts of polyvinyl butyral resin (BM-S), 0.24 wt parts of fluorine-containing acrylic silicon resin solution (F-2A), 0.002 wt part of di-n-butyltin dilaurate, 20 wt parts of toluene, 20 wt parts of 2-butanone was coated on said polymer material layer by a wire bar and after drying, it was heat-treated at 100° C. for 30 minutes to form a dye-receiving layer of about 1 μm in thickness thus an intermediate medium was prepared. When such dye-receiving layer was formed, the surface of the polymer material layer at the bottom surface indicated practically no change even when it was in contact with the solvent of the dye-receiving layer forming paint and the dye-receiving layer at the top was formed uniformly. Using such intermediate medium and the transfer printing member of Example 1, the image with gradation was printed in the dye-receiving layer of the intermediate medium under the same printing conditions as in Example 1. After printing, transfer printing member was detached from the intermediate medium. It was found that a gradation pattern was clearly printed in the dye-receiving layer without causing fusion of the dye-receiving layer and the coloring material layer of the transfer printing member. Then the intermediate medium in which the image was printed was overlapped with the ordinary paper and it was passed through the heating rolls (rubber hardness and temperature were changed to 70° and about 280° C.) in the same manner as in Example 1 and then the PET film constituting the substrate of the intermediate medium was detached from the ordinary paper and it was found that the lamination composed of the dye-receiving layer with image and the polymer material layer was transferred on the ordinary paper. Subsequently the ordinary paper with such transferred lamination was passed through the heating rolls (rubber hardness, temperature and pressure between rolls were changed to 70°, about 200° C. and about 200 kg) in the same manner as in Example 1 in such manner that the surface of the laminated member comes to the rubber roll side and thus the lamination was fixed on the ordinary paper.

The image fixed on the ordinary paper thus obtained indicated a reflective printing density of 1.4 at pulse width of 8 ms and the image had a high picture quality with uniform dot for the entire range from low printing density to high printing density. The surface luster of the ordinary paper having such fixed image was roughly same with that of the unprinted ordinary paper and its pencil-writing characteristic was also superior.

Example 4

Preparation of transfer printing member

The following paint was coated on the anchor coat layer of PET film (thickness 4 μm) having anchor coat layer at the upper surface and slippery heat resistant layer at the bottom surface, using a wire bar and after drying, it was heat-treated at 60° C. for one hour, to form a coloring material layer of about 1 μm in thickness.

(Paint)
Azo type disperse dyes 3.5 wt parts
PVC-vinylacetate copolymer resin (glass transition point, 70° C., average polymerization degree; 420) 4 wt parts
Siloxane-containing acrylic silicon resin solution (F-6A) 0.15 wt part
di-nobutyl tin dilaurate 0.001 wt par
Toluene 25 wt parts
2-butanone 25 wt pads Preparation of intermediate medium A paint composed of 10 wt parts of silicone releasing agent (PRX305 dispersion, Toray Dow Corning Silicone Co., Ltd.) and 10 wt parts of toluene was coated on a PET film with thickness of 12 μm by a wire bar and after drying, it was heat-treated at 100° C. for 1 hour to form a silicone releasing layer of about 5 μm in thickness. Further on thus prepared releasing layer was coated a paint composed of 4 wt parts of polyvinyl butyral resin (BH-S (average polymerization degree, about 1000), Sekisui Chemical Co., Ltd.), 0.75 wt part of fluorine-containing acrylic silicon resin solution (F-2A), 0.004 wt part of di-n-butyl tin dilaurate, 18 wt parts of toluene and 18 wt parts of 2-butanone, using a wire bar and after drying, it was heat-treated at 100° C. for 30 minutes to form a dye-receiving layer of about 2 μm in thickness and thus an intermediate medium was prepared. Subsequently, thus obtained intermediate medium was coupled with a transfer printing member and printing was made under the printing conditions of Example 1. After printing, intermediate medium was detached from the transfer printing member and it was found that a gradation pattern was clearly printed in the dye-receiving layer of the intermediate medium without causing fusion of dye-receiving layer of the intermediate medium and the coloring material layer of the transfer printing member.

Subsequently, thus obtained intermediate medium in which image was printed was coupled with an ordinary paper and it was passed through the heating rolls (temperature about 180° C.) in the same manner as in Example 1 to transfer the layer on the ordinary paper.

Thereafter such ordinary paper having the dye-receiving layer with the transferred image was passed through the heating roll (temperature was changed to about 180° C.) in the same manner as in Example 1 and the dye-receiving layer was fixed on the ordinary paper.

The image fixed on the ordinary paper obtained as above had the reflective printing density of 1.4 at pulse width of 8 ms. The image had a high picture quality with uniform dot for the entire range from low printing density to high printing density. The surface luster of the ordinary paper with thus fixed image was roughly same with that of unprinted ordinary paper and its pencil-writing characteristic was also superior.

Example 5

A paint composed of 10 wt parts of silicone coating material (SE9157RTV, Toray Dow Corning Silicone Co., Ltd.) and 15 wt parts of toluene was coated on a PET film of 6 μm in thickness by wire bar and after drying, it was heat-treated at 100° C. for 1 hour and thus a silicone rubber releasing layer of about 10 μm in thickness was formed. On thus obtained releasing layer was coated a paint composed of 5 wt parts of acetoacetalized polyvinyl alcohol (KS 1, average polymerization degree: about 500, Sekisui Chemical Co., Ltd.), 50 wt parts of toluene and 50 wt parts of 2-butanone and, it was dried to form a polymer material layer of about 2 μm in thickness. On such polymer material layer was coated a paint composed of 4 wt parts of polyvinyl butyral resin [BL-2 (polymerization degree-about 450), Sekisui Chemical Co., Ltd.], 0.37 wt part of siloxane containing acrylic silicon resin solution (F-6A), 0.002 wt part of di-n-dibutyltin dilaurate, 20 wt parts of toluene and 20 wt parts of 2-butanone, by wire bar, and after drying it was heat-treated at 100° C. for 30 min., to form dye-receiving layer with thickness of about 1 μm, thus forming an intermediate medium. Subsequently, the transfer printing member of Example 1 was coupled with thus obtained intermediate medium and printing was made under the printing conditions of Example 1. After printing, intermediate medium was detached from the transfer printing member and it was found that the gradation pattern was clearly printed in the dye-receiving layer of the intermediate medium without causing thermal fusion, coloring material layer of the transfer printed member and the dye-receiving layer of the intermediate medium.

Subsequently the intermediate medium with thus printed image was coupled with ordinary paper and it was passed through the heating rolls (temperature about 180° C.) in the same manner as in Example 1 to transfer the lamination of polymer material layer and dye-receiving layer of the intermediate medium on the ordinary paper. Then the ordinary paper having such transferred lamination was passed through the heating rolls (temperature was changed to about 180° C.) in the same manner as in Example 1 to fix the lamination on the ordinary paper.

The image fixed on the ordinary paper obtained as above indicated reflective printing density of 1.4 and a high picture quality with uniform dot for the entire range from low printing density to high printing density. The surface luster of the ordinary paper on which image was fixed was roughly same with that of an unprinted ordinary paper and pencil-writing characteristic was also superior.

Example 6

Preparation of transfer printing member

The paint with the following composition was coated on the anchor coat layer of the PET film (thickness 4 μm) having slippery heat resistant layer at the bottom surface and an anchor coat layer at the top surface by a wire bar and after drying, it was heat-treated at 60° C. for one hour to form a coloring material layer of about 1 μm in thickness.

(Paint)
Azo type disperse dye 3.5 wt parts
Polyvinyl butyral resin (BH-S) 4 wt parts
Siloxane containing acrylic silicon resin solution (F-6A) 0.15 wt part
di-n-butyl tin dilaurate 0.001 wt part
Toluene 25 wt parts
2-butanone 25 wt parts Preparation of intermediate medium The same silicone rubber releasing layer as described in Example 4 was formed on a PET film of 12 μm in thickness. On such releasing layer was coated a paint composed of 4 wt parts of unsaturated polyester (VYLON, RV200, flow softening point about 124° C., Toyobo Co., Ltd.), 0.15 wt part of siloxane-containing acrylic silicon resin solution (F-6A), 0.001 wt part of di-n-butyltin dilaurate, 18 wt parts of toluene, and 18 wt parts of 2-butanone by a wire bar and after drying, it was heat treated at 100° C. for 30 min. to form a dye-receiving layer of about 2 μm in thickness and an intermediate medium was thus prepared. Subsequently the transfer-printing member was coupled with said intermediate medium and printing was made under the printing conditions of Example 1. After printing, intermediate medium was detached from the transfer printed member and it was found that the gradation pattern was clearly printed in the dye-receiving layer of the intermediate medium without causing fusion of the coloring material layer of the transfer printed member and the dye-receiving layer of the intermediate medium.

Subsequently the intermediate medium in which image was printed was coupled with the ordinary paper and it was passed through the heating roll (temperature about 180° C.) by the same method as in Example 1 to transfer the dye-receiving layer on the ordinary paper. Thereafter the ordinary paper having such transferred dye-receiving layer was passed through the heating rolls (temperature was changed to about 180° C.), in the same manner as in Example 1 to fix the dye-receiving layer on the ordinary paper.

The image fixed on the ordinary paper as above indicated reflective printing density of 1.5 at the pulse width of 8 ms and the image was a high quality picture with uniform dot for the entire range from low printing density to high printing density. The surface luster of the ordinary paper with the image thus fixed was roughly same with the surface luster of an unprinted ordinary paper and the pencil-writing characteristic was also superior as;

Example 7

50 wt parts of a paint composed of 10 wt parts of epoxy acrylate resin, 0.5 wt part of sensitizer (Irgacure 184, Ciba-Geigy (Japan) Ltd.), 2, 0 wt parts of siloxane-containing acrylic silicon resin solution (F-6A), 0.002 wt part of di-n-butyl tin dilaurate and 90 wt parts of ethyl acetate on a PET film of 9 μm in thickness by a wire bar and after drying, it was irradiated by 4 kw high voltage mercury lamp to cure the epoxyacrylate resin by UV ray and thus a releasing layer of about 1 μm in thickness was formed. The same dye-receiving layer as in Example 1 was formed on such releasing layer and thus an intermediate medium was prepared. Thereafter the transfer printing member of Example 1 was coupled with the intermediate medium obtained in the above and printing was made under the same printing conditions as in Example 1. After printing, intermediate medium was detached from the transfer printing member and it was found that the gradation pattern was clearly printed in the dye-receiving layer of the intermediate medium without causing fusion of the coloring material layer of the transfer printing member and the dye-receiving layer of the intermediate medium.

Subsequently the intermediate medium with the printed image was coupled with an ordinary paper and it was passed between the heating rolls (temperature, about 180° C.), in the same manner as in Example 1 and the dye-receiving layer of the intermediate medium was transferred on the ordinary paper.

Subsequently the ordinary paper with thus transferred dye-receiving layer was passed between the heating rolls (temperature was changed to about 150° C.), in the same manner as in Example 1 and thus the dye-receiving layer was fixed on the ordinary paper.

The image fixed on the ordinary paper as above indicated reflective printing density of 1.5 at the pulse width of 8 ms and the image was a high quality picture with uniform dot for the entire range from low printing density to high printing density. The surface luster of the ordinary paper with such fixed image was roughly same with the surface luster of an unprinted ordinary paper and pencil-writing characteristic was also superior.

What is claimed is:

1. An intermediate medium for use in a thermal transfer printing method comprising the combination of a transfer printing member having a coloring material layer on a substrate A, an intermediate medium having a dye-receiving layer on the substrate B, and an image receiving member comprising paper, said dye-receiving layer being formed with at least a polymer having a flow softening point of less than 300° C., wherein the coloring material layer of the transfer printing member is overlapped with the dye-receiving layer of the intermediate medium and then a sublimation thermal transfer image is transfer-printed in the dye-receiving layer of the intermediate medium by heating the transfer printing member with a printing head and subsequently the intermediate medium is overlapped with said image receiving member in such a manner that the dye-receiving layer with printed image comes to the side of said image receiving member and the dye-receiving layer with printed image is transferred from substrate B of the intermediate medium directly onto said image receiving member by heat and/or pressure and further the dye-receiving layer is fixed on the image receiving member by heat and/or pressure.

2. Intermediate medium used for thermal transfer printing method described in claim 1 which has a dye-receiving layer on the substrate B and said dye-receiving layer is formed at least by using a polymer with average polymerization degree of less than 3000.

3. Intermediate medium used for thermal transfer printing method described in claim wherein the intermediate medium has a dye-receiving layer on the substrate B and said dye-receiving layer is formed at least by using polyvinylacetal.

4. Intermediate medium described in claim which has such construction that it has a successive lamination of polymer material layer and dye-receiving layer on the substrate B.

5. Intermediate medium described in claim which has such construction that it has a successive lamination of releasing layer and dye-receiving layer on the substrate B.

6. Intermediate medium described in claim which has such construction that it has a successive lamination of releasing layer, polymer material layer and dye-receiving layer on the substrate B.

7. Intermediate medium described in claim 4 or 6 wherein the polymer material layer is formed at least by using a polymer with average polymerization degree of less than 3000.

8. Intermediate medium described in claim 4 or 6 wherein the polymer material layer is formed at least by using at least one kind of polymer material selected from the group consisting of acrylonitrile-styrene copolymer resin, polystyrene, styrene-acrylic copolymer resin, rubber chloride, chlorinated polypropylene, polyvinyl chloride resin, chlorinated polyvinyl chloride resin, vinyl acetate resin, vinyl chloride-vinyl acetate copolymer resin, vinyl chloride-acrylic acid ester copolymer resin, saturated polyester, polyester urethane, polyvinyl acetal, polyvinyl alcohol, cellulose derivative, processed starch, starch derivative and polycarbonate.

* * * * *